(12) United States Patent  
Hashimoto

(10) Patent No.: US 9,025,176 B2
(45) Date of Patent: May 5, 2015

(54) IMAGE PROCESSING APPARATUS AND IMAGE PROCESSING SYSTEM

(71) Applicant: Naoki Hashimoto, Nagoya (JP)

(72) Inventor: Naoki Hashimoto, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 92 days.

(21) Appl. No.: 13/772,883

(22) Filed: Feb. 21, 2013

(65) Prior Publication Data

US 2013/0258387 A1     Oct. 3, 2013

(30) Foreign Application Priority Data

Mar. 29, 2012    (JP) ................................ 2012-077439

(51) Int. Cl.
    *G06K 15/00*       (2006.01)
    *G06F 3/12*        (2006.01)

(52) U.S. Cl.
    CPC .......... *G06K 15/4045* (2013.01); *G06F 3/1204* (2013.01); *G06F 3/1207* (2013.01); *G06F 3/1229* (2013.01); *G06F 3/1236* (2013.01); *G06F 3/126* (2013.01); *G06F 3/1288* (2013.01); *G06F 3/1292* (2013.01); *G06F 3/1239* (2013.01)

(58) Field of Classification Search
    None
    See application file for complete search history.

(56) References Cited

U.S. PATENT DOCUMENTS

| 6,791,703 | B1 * | 9/2004 | Maeda et al. ................ 358/1.15 |
| 2001/0046065 | A1 | 11/2001 | Furukawa et al. |
| 2002/0144023 | A1 * | 10/2002 | Kawabuchi et al. ............ 710/5 |
| 2003/0140260 | A1 * | 7/2003 | Kizawa et al. ................ 713/300 |
| 2005/0002058 | A1 | 1/2005 | Hirabayashi |
| 2005/0185993 | A1 * | 8/2005 | Kobayashi .................... 399/309 |
| 2006/0026121 | A1 * | 2/2006 | Terao .............................. 707/1 |
| 2007/0260337 | A1 * | 11/2007 | Sugiyama ..................... 700/40 |
| 2009/0168100 | A1 * | 7/2009 | Huster ......................... 358/1.15 |
| 2011/0058215 | A1 * | 3/2011 | Yoshizumi et al. .......... 358/1.15 |
| 2011/0075186 | A1 | 3/2011 | Azuma |
| 2011/0194123 | A1 | 8/2011 | Sweet et al. |

(Continued)

FOREIGN PATENT DOCUMENTS

| JP | 7-47750 A | 2/1995 |
| JP | 11-122411 | 4/1999 |

(Continued)

OTHER PUBLICATIONS

Extended European Search Report dated Feb. 13, 2014 from related European Application No. 13 15 6220.9.

(Continued)

*Primary Examiner* — King Poon
*Assistant Examiner* — Vincent Peren
(74) *Attorney, Agent, or Firm* — Scully, Scott, Murphy & Presser, P.C.

(57) ABSTRACT

There is provided an image processing apparatus including: a receiving unit configured to receive a job from an external apparatus; an image processing unit configured to perform image processing on the basis of the job received by the receiving unit; and a control device. The control device configured to perform: an establishing process of establishing an allowance status in which the image processing apparatus is allowed to be designated as a job input destination from a user, with respect to the external apparatus; and a restricting process of restricting the image processing apparatus from being in the allowance status in a case where the image processing apparatus is in a restriction status in which the image processing is restricted.

28 Claims, 10 Drawing Sheets

(56) References Cited

U.S. PATENT DOCUMENTS

| | | | |
|---|---|---|---|
| 2011/0194141 A1* | 8/2011 | Sweet et al. | 358/1.15 |
| 2011/0299110 A1 | 12/2011 | Jazayeri et al. | |
| 2012/0062946 A1* | 3/2012 | Kitagata | 358/1.15 |
| 2012/0324107 A1* | 12/2012 | Subramaniam et al. | 709/225 |
| 2013/0201503 A1* | 8/2013 | Miller et al. | 358/1.13 |

FOREIGN PATENT DOCUMENTS

| | | |
|---|---|---|
| JP | 2001-273109 A | 10/2001 |
| JP | 2001-282488 A | 10/2001 |
| JP | 2004-206398 A | 7/2004 |
| JP | 2004-243746 A | 9/2004 |
| JP | 2004-362328 A | 12/2004 |
| JP | 2008-159063 A | 7/2008 |
| JP | 2009-130696 A | 6/2009 |
| JP | 2010-228458 A | 10/2010 |
| JP | 2011-73272 A | 4/2011 |
| JP | 2011-197949 A | 10/2011 |
| JP | 2012-6285 A | 1/2012 |

OTHER PUBLICATIONS

Notification of Reasons for Refusal dated Jul. 15, 2014, received in related Japanese Application No. 2012-077439, together with a partial English language translation.

Notification of Reasons for Refusal dated Nov. 25, 2014 received in related JP 2012-077439 together with an English language translation.

Chinese Office Action dated Feb. 6, 2015 issued in corresponding Chinese Patent Application No. CN 201310104762.1.

* cited by examiner

IMAGE PROCESSING APPARATUS AND IMAGE PROCESSING SYSTEM

CROSS-REFERENCE TO RELATED APPLICATIONS

This application claims priority from Japanese Patent Application No. 2012-077439 filed on Mar. 29, 2012, the entire subject matter of which is incorporated herein by reference.

BACKGROUND

There have been known technologies in which in an image processing system including an external apparatus and an image processing apparatus, the external apparatus is used to select the image processing apparatus for performing image processing, and a job is input from the external apparatus to the selected image processing apparatus.

For example, there is disclosed a technology in which in an image printing system including an image delivering apparatus and printers, when a user instructs the image delivering apparatus to print an image, the image delivering apparatus searches for printers capable of printing the image on the basis of the kinds of ink and a sheet size appropriate for printing the image, and displays a list of searched printers.

SUMMARY

The above-described related-art technology has following disadvantages. That is, an image processing apparatus is unable to control whether to be a target as a job input destination. For example, even through a printer actually has a difficulty in printing such as a hardware failure, if its specification is appropriate for the image, the printer is searched for. For this reason, the user can designate that printer. In such a case, the job is wastefully input to the printer having the difficulty in printing.

Therefore, illustrative aspects of the present invention provide an image processing apparatus capable of suppressing a job from being input from an external apparatus to the image processing apparatus according to the status of the image processing apparatus, and an image processing system having the image processing apparatus.

According to a first illustrative aspect of the invention, there is provided an image processing apparatus comprising: a receiving unit configured to receive a job from an external apparatus; an image processing unit configured to perform image processing on the basis of the job received by the receiving unit; and a control device. The control device is configured to perform: an establishing process of establishing an allowance status in which the image processing apparatus is allowed to be designated as a job input destination from a user, with respect to the external apparatus; and a restricting process of restricting the image processing apparatus from being in the allowance status in a case where the image processing apparatus is in a restriction status in which the image processing is restricted.

The image processing apparatus disclosed in this specification establishes the allowance status in which the image processing apparatus is allowed to be designated as a job input destination by the user, with respect to the external apparatus. After establishing the allowance status, if the user designates the image processing apparatus as the job input destination, the image processing apparatus receives the job from the external apparatus, and performs image processing of the job.

Further, in a case where the image processing apparatus is in the restriction status, the image processing apparatus performs the restricting process of restricting the image processing apparatus from being in the allowance status. Examples of the restriction status include a status where an error has occurred in the image processing apparatus, a power saving status, and a status where the image processing apparatus has reached a restriction on the use. Examples of the restricting process include releasing of the allowance status, or prohibition of establishment of the allowance status. For example, the releasing of the allowance status includes: (1) a mode of notifying the external apparatus of an instruction for excluding the image processing apparatus from a list of designatable printers; and (2) a mode of interrupting the connection with the external apparatus without responding to a request from the external apparatus.

That is, if the image processing apparatus disclosed in this specification establishes the allowance status between the image processing apparatus and the external apparatus, it is possible to use the external apparatus to designate the image processing apparatus as the job input destination. In a case where the image processing apparatus is in the restriction status, the image processing apparatus restricts the allowance status between the image processing apparatus and the external apparatus. Therefore, it is possible to prevent the image processing apparatus from being designated as the job input destination by the user.

According to a second illustrative aspect of the invention, in the image processing apparatus according to the first illustrative aspect, wherein in a case where the allowance status with respect to the external apparatus has been established, the restricting process releases the establishment of the allowance status with respect to the external apparatus by the establishing process, as the restricting process.

Since the image processing apparatus independently releases the allowance status with respect to the external apparatus, it is impossible for the external apparatus to designate the image processing apparatus as the job input destination. Therefore, when the image processing apparatus is in the restriction status, it is possible to certainly prevent the image processing apparatus from being designated by the user.

According to a third illustrative aspect of the invention, in the image processing apparatus according to the first or second illustrative aspect, wherein in a case where the allowance status with respect to the external apparatus has not been established, the restricting process restricts establishment of the allowance status with respect to the external apparatus by the establishing process, as the restricting process.

By restricting the establishment of the allowance status with respect to the external apparatus, it is impossible for the external apparatus to recognize the image processing apparatus. As a result, when the image processing apparatus is in the restriction status, it is possible to certainly prevent the image processing apparatus from being designated by the user.

According to a fourth illustrative aspect of the invention, the image processing apparatus according to any one of the first to third illustrative aspect further comprises: an interruption receiving unit configured to receive an interruption request for interrupting power supply, wherein the control device is further configured to perform: an interrupting process of interrupting power supply in response to the interruption request, and wherein when the interruption request is received in a case where the allowance status with respect to the external apparatus has been established, the interrupting process releases the allowance status, and after the release, the interrupting process interrupts power supply to the image processing apparatus except for a part for activating the image processing apparatus.

If power supply is interrupted in a state where the allowance status with respect to the external apparatus has been established, depending on a time lag of a process or the like, it may be possible to designate the image processing apparatus at a timing in a period from when the interruption of power supply is received to when the external apparatus recognizes the interruption of power supply. For this reason, by interrupting power supply after the allowance status with respect to the external apparatus is released, it is possible to more appropriately restrict the image processing apparatus from being designated as the job input destination by the user.

According to a fifth illustrative aspect of the invention, in the image processing apparatus according to any one of the first to fourth illustrative aspect, wherein the control device is further configured to perform: a storage process of storing history information, which is information representing that the allowance status with respect to the external apparatus has been released; and a reestablishing process of establishing the allowance status with respect to the external apparatus if the image processing apparatus is in a non-restriction status in which the image processing is not restricted, in a case where the storage process has stored the history information therein.

In a case where the image processing apparatus is in the non-restriction status after the establishment of the allowance status is released by the restricting process, it is preferable to automatically restore the establishment of the allowance status having been released.

According to a sixth illustrative aspect of the invention, there is provided an image processing apparatus comprising: a receiving unit configured to receive a job from an external apparatus; an image processing unit configured to perform image processing on the basis of the job received by the receiving unit; and a control device. The control device is configured to perform: a transmitting process of transmitting receiver information, which is information for making the image processing apparatus be recognized as a job input destination, to the external apparatus; and a restricting process of restricting the receiver information from being transmitted by the transmitting process in a case where the image processing apparatus is in a restriction status in which the image processing is restricted.

That is, in a case where the image processing apparatus is in the restriction status, the image processing apparatus restricts transmission of the receiver information, which is information for making the image processing apparatus be recognized as the job input destination such that the external apparatus is unable to recognize the image processing apparatus as the job input destination. Therefore, in the restriction status, the image processing apparatus can prevent the image processing apparatus from being designated as the job input destination by the user.

According to a seventh illustrative aspect of the invention, in the image processing apparatus according to any one of the first to sixth illustrative aspect, wherein the restriction status includes a status in which an error has occurred in the image processing apparatus.

In a case where an error occurs, even if the job is received, the possibility of immediately performing image processing may be low. For this reason, it is preferable to prevent the image processing apparatus having an error from being designated as the job input destination by the user.

According to an eighth illustrative aspect of the invention, in the image processing apparatus according to the seventh illustrative aspect, wherein the control device is further configured to perform: a discriminating process of discriminating a kind of the error having occurred in the image processing apparatus; and a deciding process of deciding whether the restricting process is necessary or unnecessary on the basis of the discrimination result by the discriminating process, wherein in a case where the deciding process decides that the restricting process is unnecessary, the control device is configured not to perform the restricting process.

Depending to the contents of the error, it may be possible to perform image processing. For this reason, usability can be improved by making it possible to prevent the restricting process according to the contents of the error.

According to a ninth illustrative aspect of the invention, in the image processing apparatus according to the eighth illustrative aspect, wherein in a case where the discrimination result by the discriminating process indicates that the error is a job analysis error, the deciding process decides that the restricting process is unnecessary.

Since the job analysis error is not an error of the image processing apparatus itself, it is possible to receive the job again and perform image processing. For this reason, the image processing apparatus may be selected as the job input destination, and it is preferable not to perform the restricting process. Incidentally, examples of the job analysis error include a "Memory Full" error during conversion of print data into a bitmap image (an RIP process), and a syntax error of print data (PDL data).

According to a tenth illustrative aspect of the invention, in the image processing apparatus according to the ninth illustrative aspect, wherein the control device is further configured to perform: a notifying process of notifying that there is an error in a job, in the case where the discrimination result by the discriminating process indicates that the error is a job analysis error.

In a case where there is a problem in the job itself, the possibility of requiring coping in the job input source may be high. For this reason, by notifying the user that there is the error in the job, it becomes easy to cope with the error. Incidentally, during the notification, a notification instruction is transmitted from the image processing apparatus to the external apparatus, and notification to the user is made by the external apparatus.

According to an eleventh illustrative aspect of the invention, in the image processing apparatus according to any one of the eighth to tenth illustrative aspect, wherein in a case where the discrimination result by the discriminating process indicates that the error is an error allowing acquisition of the job, the deciding process decides that the restricting process is unnecessary, and wherein in a case where the discrimination result by the discriminating process indicates that the error is an error making acquisition of the job impossible, the deciding process decides that the restricting process is necessary.

If the job is acquirable, after the error is fixed, it is possible to perform the job without retransmitting the job. For this reason, it is preferable not to perform the restricting process. Examples of the error allowing acquisition of the job include an error which the user can cope with. Incidentally, examples of the error allowing acquisition of the job include a "No Paper" error, a "Cover Open" error, a "Paper Jam" error, and the like. On the other hand, the error making acquisition of the job impossible corresponds to, for example, a hardware failure which may be difficult for the user to cope with, such as a memory failure.

According to a twelfth illustrative aspect of the invention, in the image processing apparatus according to any one of the eighth to eleventh illustrative aspect, wherein the control device is further configured to perform: a restriction error setting process of allowing setting of whether the restricting process is necessary for each kind of error, and wherein the deciding process decides whether the restricting process is necessary or unnecessary on the basis of the discrimination result by the discriminating process and the set contents by the restriction error setting process.

Since the user can determine an error to be a performance object of the restricting-process, the usability can be improved.

According to a thirteenth illustrative aspect of the invention, in the image processing apparatus according to any one of the first to twelfth illustrative aspect, wherein the control device is further configured to perform: a determining process of determining whether a detection timing of the restriction status is in a waiting period when it is necessary to wait for the restricting process, and wherein in a case where the determining process determines that the detection timing is in the waiting period, the control device is configured not to perform the restricting process until the waiting period elapses.

Depending on the detection timing of the restriction status, it may be preferable not to immediately perform the restricting process. For this reason, by setting the waiting period for waiting for performance of the restricting process and making it possible to wait for the performance of the restricting process until the waiting period elapses, the usability can be improved.

According to a fourteenth illustrative aspect of the invention, in the image processing apparatus according to the thirteenth illustrative aspect, wherein the determining process sets a period from when a status transmission request is received from the external apparatus to when a response to the status transmission request is completed as the waiting period.

If the restricting process is performed during the status response, the external apparatus is unable to confirm the accurate status. For this reason, it is preferable to complete the status response.

According to a fifteenth illustrative aspect of the invention, the image processing apparatus according to the thirteenth or fourteenth illustrative aspect, wherein the determining process sets a period from when a procedure of acquiring a job from the external apparatus starts to when completion of the corresponding job is notified as the waiting period.

If the restricting process is performed during the acquisition of the job, the acquisition of the job is likely to be insufficient. Therefore, even if restoring from the restriction status has been performed, recovery of the print job may not be expected. For this reason, it is preferable to complete the acquisition of the job during the acquisition.

According to a sixteenth illustrative aspect of the invention, in the image processing apparatus according to any one of the thirteenth to fifteenth illustrative aspect, wherein the control device is further configured to perform: a waiting-period setting process of allowing setting of the waiting period.

Since the user can set the waiting period, the usability can be improved.

According to a seventeenth illustrative aspect of the invention, in the image processing apparatus according to any one of the first to sixteenth illustrative aspect, wherein the image processing apparatus has a power saving status, in which power supply to an element for the image processing is restricted, and a waiting status for waiting for performance of the image processing without restricting power supply to the element, wherein the image processing apparatus further comprises a switching unit configured to switch the image processing apparatus between the power saving status and the waiting status, and wherein the restriction status includes a status in which the image processing apparatus is in the power saving status.

The image processing apparatus is unable to perform image processing in the power saving status. Further, even if transition from the power saving status to the waiting status is possible when the job is received in the power saving status, the transition needs a time and makes the user wait. For this reason, it is preferable to prevent the image processing apparatus which is in the power saving status from being designated as the job input destination by the user.

According to an eighteenth illustrative aspect of the invention, the image processing apparatus according to the seventeenth illustrative aspect further comprises: a transition receiving unit configured to receive a transition operation for transition from the power saving status to the waiting status, wherein in a case where the transition operation is received during an operation in the power saving status, the switching unit is configured to switch the image processing apparatus to the waiting status.

Examples of the transition operation include pressing of a specific switch, and inputting of a password. The apparatus, which requires the transition operation of the user for transition from the power saving status to the waiting status, is unable to perform the image processing at least until the transition operation is performed. For this reason, it is preferable to prevent such a time-consuming apparatus from being designated as the job input destination by the user.

According to a nineteenth illustrative aspect of the invention, in the image processing apparatus according to any one of the first to eighteenth illustrative aspect, wherein the restriction status includes a status where the user using the image processing apparatus has reached a restriction on the use.

In a case where the user has reached the restriction on the use, even if the job is received, it is impossible to perform the image processing for that user. For this reason, it is preferable to prevent the image processing apparatus having reached the restriction on the use from being designated as the job input destination by the user.

According to a twentieth illustrative aspect of the invention, there is provided an image processing system comprising the image processing apparatus according to the first illustrative aspect and an external apparatus configured to input a job to the image processing apparatus.

According to a twenty-first illustrative aspect of the invention, there is provided an image processing system comprising the image processing apparatus according to the sixth illustrative aspect and an external apparatus configured to input a job to the image processing apparatus.

According to the present invention, an image processing apparatus capable of suppressing a job from being input from the external apparatus to the image processing apparatus according to the status of the image processing apparatus, and an image processing system having the image processing apparatus.

DETAILED DESCRIPTION

Hereinafter, an exemplary embodiment of an image processing apparatus according to the present invention will be described in detail with reference to the accompanying drawings. The present exemplary embodiment has been obtained by applying the present invention to a printer that is connected to a cloud printing system including a cloud server for storing print data. The cloud server is a virtual server which is at a destination of a cloud in the concept of cloud computing, and is a server which makes packets pass through the cloud and can be operated with a WEB browser.

[Configuration of Cloud Printing System]

Figure 1:
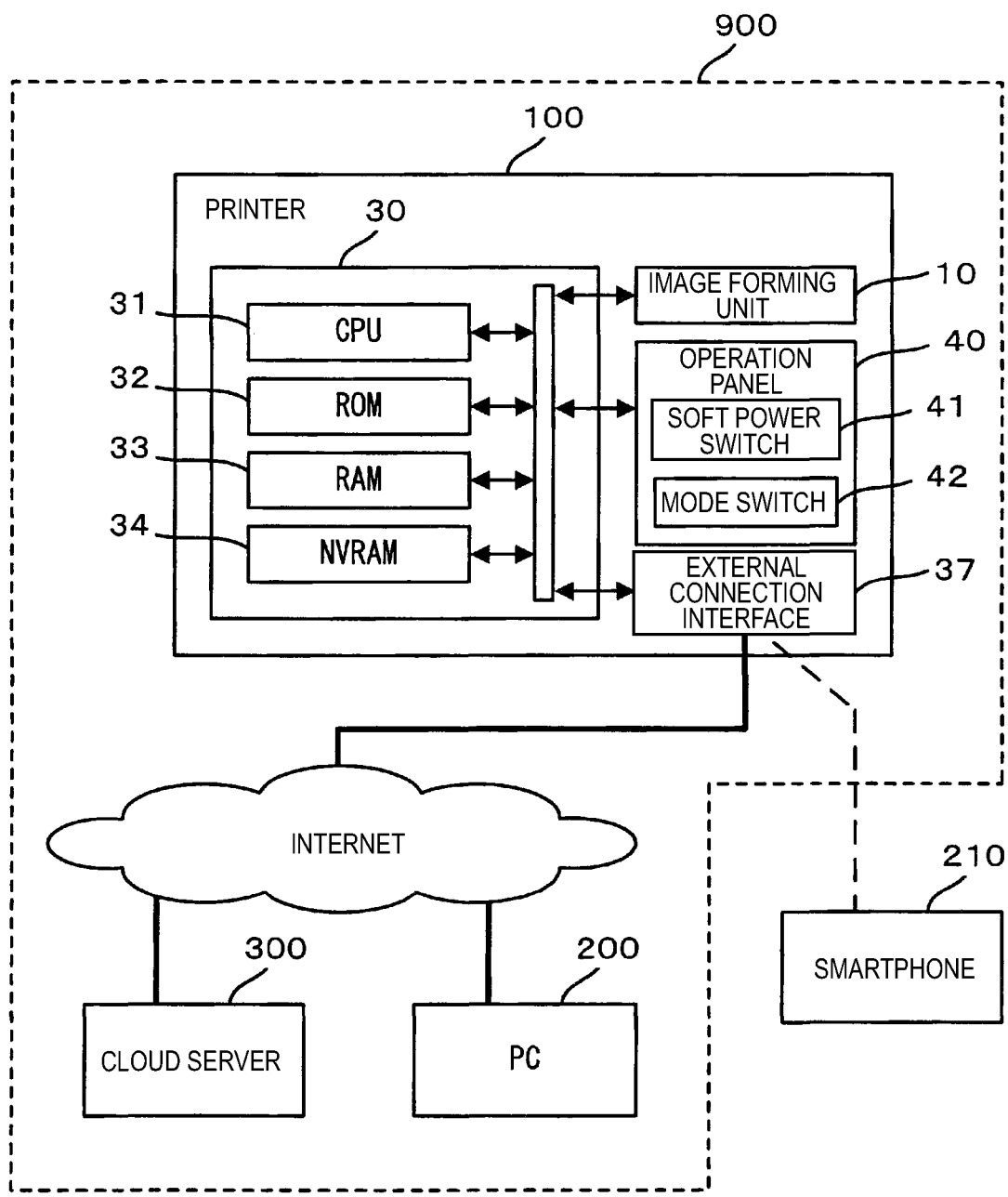
FIG. 1 is a block diagram illustrating a configuration of a cloud printing system and an electrical configuration of a printer according to an exemplary embodiment of the invention.

As shown in FIG. 1, a cloud printing system 900 of the present exemplary embodiment includes a printer 100 (one example of an image processing apparatus), a PC 200, and a cloud server 300 (one example of an external apparatus). The cloud server 300 is an apparatus for storing a print job output from the PC 200 and transmitting the stored print job to the printer 100.

In the cloud printing system 900 of the present exemplary embodiment, in order to input a print job from the PC 200 to the cloud server 300, the PC 200 needs to establish communication connection with the cloud server 300. Further, in order for the printer 100 to acquire print data from the cloud server 300, the printer 100 needs to establish communication connection with the cloud server 300. Here, the communication connection includes not only physical connection but also a status in which the cloud server 300 allows communication with the PC 200 or the printer 100.

In the present exemplary embodiment, an operation of the PC 200 for establishing communication connection with the cloud server 300 is referred to "log-in", and an operation for interrupting the communication connection is referred to as "log-off". Further, an operation of the printer 100 for establishing communication connection with the cloud server 300 is referred to as "sign-in", and an operation for interrupting the communication connection is referred to as "sign-out".

The image processing apparatus connected to the cloud server 300 is not limited to the printer 100. However, for simplifying explanation, only the printer 100 is shown in FIG. 1. Further, an information processing apparatus connected to the cloud server 300 is not limited to the PC 200. However, for simplifying explanation, only the PC 200 is shown in FIG. 1.

[Configuration of Printer]

As shown in FIG. 1, the printer 100 of the present exemplary embodiment includes a control unit 30, which includes a CPU 31, a ROM 32, a RAM 33, and a non-volatile RAM (NVRAM) 34. The control unit 30 is electrically connected to an image forming unit 10, an operation panel 40, and an external connection interface 37. The image forming unit 10 prints images onto sheets. The operation panel 40 displays operation situations and receives user's input operation.

In the ROM 32, there are stored firmware which is control programs for controlling the printer 100, various options, initial values, and so on. The RAM 33 and the NVRAM 34 are used as a work area into which various control programs are read, or a storage area for temporarily storing print data.

The CPU 31 (one example of an establishing unit, a restricting unit, an interrupting unit, a storage unit, a reestablishing unit, a discriminating unit, a deciding unit, a notifying unit, a determining unit, a switching unit, or a transmitting unit) controls each component of the printer 100 while storing process results in the RAM 33 or the NVRAM 34 according to control programs read from the ROM 32 and signals transmitted from various sensors.

The external connection interface 37 (one example of a receiving unit) is an interface enabling communication with an external apparatus. In a case where the external connection interface 37 is connected to the Internet, the printer 100 can receive print jobs from the cloud server 300. In the present exemplary embodiment, connection enabling acquisition of a job from the PC 200 through the cloud server 300 is referred to as "cloud connection."

Further, the external connection interface 37 can also be used even for connection enabling direct communication with an external apparatus without a router or the like interposed therebetween (which is, for example, WiFi-Direct, and is hereinafter referred to as "direct connection"). The printer 100 of the present exemplary embodiment can receive print jobs directly from a smartphone 210 (one example of the external apparatus) by establishment of direct connection.

The image forming unit 10 (one example of an image processing unit) needs only to be able to print images onto sheets. Therefore, the image forming system of the image forming unit 10 may be an electrophotographic system or an inkjet system. Further, the image forming unit 10 may be capable of color printing, or may be dedicated for monochrome printing. In the present exemplary embodiment, it is assumed that the image forming unit 10 uses electrophotographic system, and is capable of color printing.

The operation panel 40 includes various buttons for receiving user's operation, and a touch panel screen for displaying text information, buttons, and so on. For example, the various bottoms include an 'OK' button for instructing start of a printing operation, and a 'CANCEL' button for instructing cancellation of a printing operation. Further, the operation panel 40 receives input operation for performing sign-in or sign-out and various kinds of option input operation.

The operation panel 40 also includes a soft power switch 41 (one example of a interruption receiving unit) that is composed of a contact switch such as a membrane switch and receives ON/OFF of power supply, and a mode switch 42 (one example of a transition receiving unit or the switching unit) that receives an instruction for switching an operation mode. Specifically, the printer 100 has a power supply mode and a power saving mode as operation modes. During an operation in the power supply mode, if the mode switch 42 is pressed, the printer 100 transitions to the power saving mode. On the other hand, during an operation in the power saving mode, if the mode switch 42 is pressed, the printer 100 transitions to the power supply mode.

In the power supply mode, power is supplied to all of the image forming unit 10, the control unit 30, the operation panel 40, and the external connection interface 37, so that a printing process and reception of a job are possible. On the other hand, in the power saving mode, power supply to the image forming unit 10 stops. That is, the power saving mode is an operation mode having power consumption smaller than that in the power supply mode, and is a status where power is not supplied to the image forming unit 10 and thus there is a difficulty in printing. However, even in the power saving mode, since power supply to the operation panel 40 and the external connection interface 37 continues, the printer 100 can receive panel operation of a user and an input signal from the external apparatus.

The printer 100 starts in the power supply mode. During an operation in the power supply mode, in a case where a duration when the printer is not used without printing and user's operation becomes a predetermined period or more, or in a case where pressing of the mode switch 42 is detected, the printer 100 transitions from the power supply mode to the power saving mode. On the other hand, during an operation in the power saving mode, in a case where panel operation of the user or an input signal from the external apparatus is received, or in a case where pressing of the mode switch 42 is detected, the printer 100 transitions from the power saving mode to the power supply mode.

If the soft power switch 41 is turned off, in the printer 100, power supply is cut off regardless of the operation mode. Specifically, power supply to the operation panel 40 and the external connection interface 37 except for the image forming unit 10, an image reading unit 20, the control unit 30, and the soft power switch 41 stops. That is, a status where the soft power switch 41 is in an OFF state has power consumption smaller than that in the power saving mode, so that printing and communication with the external apparatus are impossible in this state. Incidentally, even when the soft power switch is in the OFF state, power supply to the soft power switch 41 continues, so that input to the soft power switch 41 can be received. Input to the soft power switch 41 is detected by a dedicated control unit different from the control unit 30. If the soft power switch 41 is turned on, power supply to the image forming unit 10, the image reading unit 20, the control unit 30, the operation panel 40, and the external connection interface 37 restarts, whereby the printer 100 becomes the power supply mode.

[Outline of Operation of Cloud Printing System]

(Cloud Connection)

Figure 2:
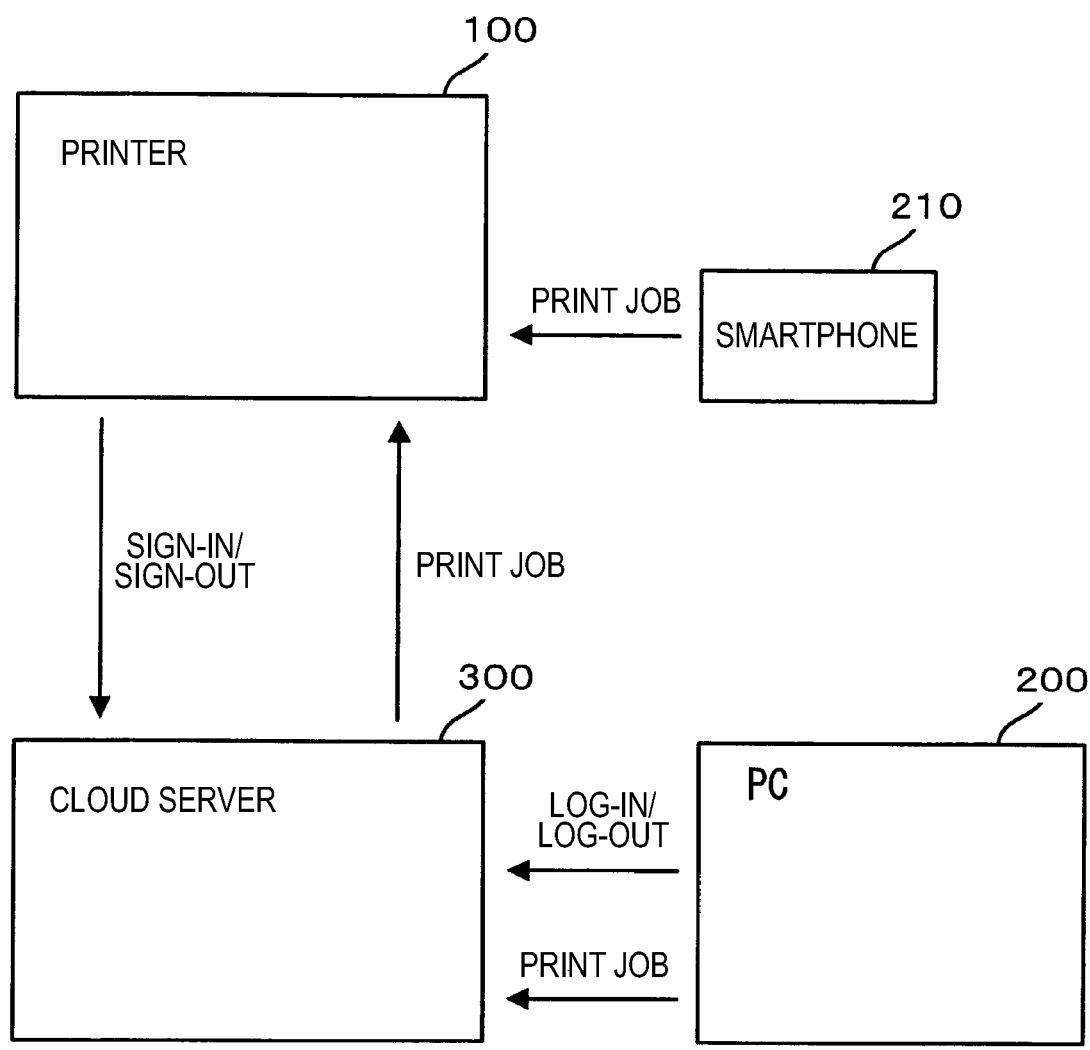
FIG. 2 is a block diagram schematically illustrating an operation of the cloud printing system according to the exemplary embodiment.

Now, the outline of an operation of the cloud printing system 900 in the cloud connection will be described with reference to FIGS. 2 and 3. In order to use the cloud connection of the cloud printing system 900, it is necessary to establish both of communication connection between the printer 100 and the cloud server 300 and communication connection between the PC 200 and the cloud server 300 in advance.

First, in sign-in for establishing communication connection between the printer 100 and the cloud server 300, a user 'A' inputs an account of the user 'A' and a password of that account to the printer 100. Then, when the cloud server 300 authenticates the account of the user 'A', communication connection between the printer 100 and the cloud server 300 is established.

When establishing communication connection with the printer 100, that is, succeeding in sign-in, the cloud server 300 starts regular status transmission request for the printer 100. When receiving a status transmission request from the cloud server 300, the printer 100 transmits a current state (information on whether any error has occurred and information on which error has occurred in a case where an error has occurred) as a response.

On the other hand, in log-in for establishing communication connection between the PC 200 and the cloud server 300, the user 'A' inputs the account of the user 'A' and the password of that account to the PC 200. Then, when the cloud server 300 authenticates the account of the user 'A', communication connection between the PC 200 and the cloud server 300 is established.

When the communication connection between the PC 200 and the cloud server 300 is established, that is, the log-in succeeds, it becomes possible to use the PC 200 to input a print job to the cloud server 300. In order to input a print job to the cloud server 300, the PC 200 displays a list of printers to which it is possible to input print jobs with the account of the user 'A' as print-job input destinations. The user designates a print-job input destination from the printers displayed on the PC 200. Next, the user inputs the print job. When the print job is input to the cloud server 300, the PC 200 waits for a completion notification of the print job to be transmitted from the cloud server 300.

In a case of receiving the print job of the user 'A', corresponding to the account with which the sign-in has been performed, from the PC 200, the cloud server 300 transmits a job acquisition notification representing that the print job has been received, to a printer (the printer 100 in the present exemplary embodiment) which has signed in with that account. In response to the job acquisition notification, the printer 100 outputs a job transmission request to the cloud server 300. The job acquisition notification includes the IP address of the cloud server 300, the account, the password, the user name, the job name, and print job information such as security information.

When receiving the job transmission request from the printer 100, the cloud server 300 transmits the print job to the printer 100. The printer 100 receives the print job from the cloud server 300, and performs printing of the print job.

When completing the processing of the print job, the printer 100 transmits a job completion notification to the cloud server 300. When receiving the job completion notification from the printer 100, the cloud server 300 outputs the job completion notification to the external apparatus (the PC 200 in the present exemplary embodiment) having input the print job.

(Direct Connection)

Figure 4:
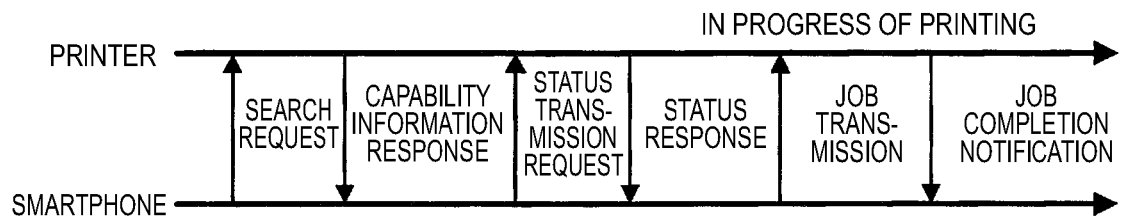
FIG. 4 is a sequence diagram schematically illustrating an operation of the cloud printing system of the exemplary embodiment during direct connection.

In a case of inputting a print job from the smartphone 210 by direct connection, as shown in FIG. 4, a request for searching for a printer capable of communication (the printer 100 in the present exemplary embodiment) is broadcast from the smartphone 210.

When receiving the search request, the printer 100 transmits capability information including information on the printer 100 (one example of the receiver information) as a response (one example of an establishing unit). The capability information includes, for example, communication capability and image processing capability as information for making the printer 100 be recognized as a job input destination by the smartphone 210. When receiving the capability information from the printer 100, the smartphone 210 can select the printer 100 as the input destination of the print job. Incidentally, the smartphone 210 displays one printer to be used from selectable printers in a setting screen of an application program. In a case of changing the printer to be used, the smartphone 210 displays a list of printers to which the print job can be input and which are selectable as targets. The user designates a printer from the printers displayed in the list.

When receiving the capability information from the printer 100, that is, if succeeding in searching for the printer 100, the smartphone 210 starts regular status transmission request for the printer 100. When receiving a status transmission request from the smartphone 210, the printer 100 transmits status information (one example of the receiver information) storing a current status, as a response. If the smartphone 210 does not receive the status information from the printer 100 within a predetermined period after the transmission of the status transmission request, the smartphone 210 determines that the connection with the printer 100 is interrupted, and the smartphone 210 excludes the printer 100 from the targets as the input destinations of the print job. That is, the smartphone 210 does not display the printer excluded from the targets as the input destinations of the print job, in the list of selectable printers.

Further, after searching for the printer 100, according to a print instruction from the user, the smartphone 210 transmits the print job to the printer 100. The printer 100 receives the print job from the smartphone 210, and performs printing of the print job. When completing the processing of the print job, the printer 100 transmits a job completion notification to the smartphone 210.

That is, in the cloud printing system 900, in order to use the printer 100 through the cloud server 300, it is necessary to perform sign-in from the printer 100 to the cloud server 300, whereby the printer 100 is allowed as an input destination of the print job. On the other hand, in order to use the printer 100 by direct connection, it is necessary to transmit capability information from the printer 100 to the smartphone 210, whereby the printer 100 is recognized as an input destination of the print job.

(Outline of Sign-in Operation)

Figure 5:
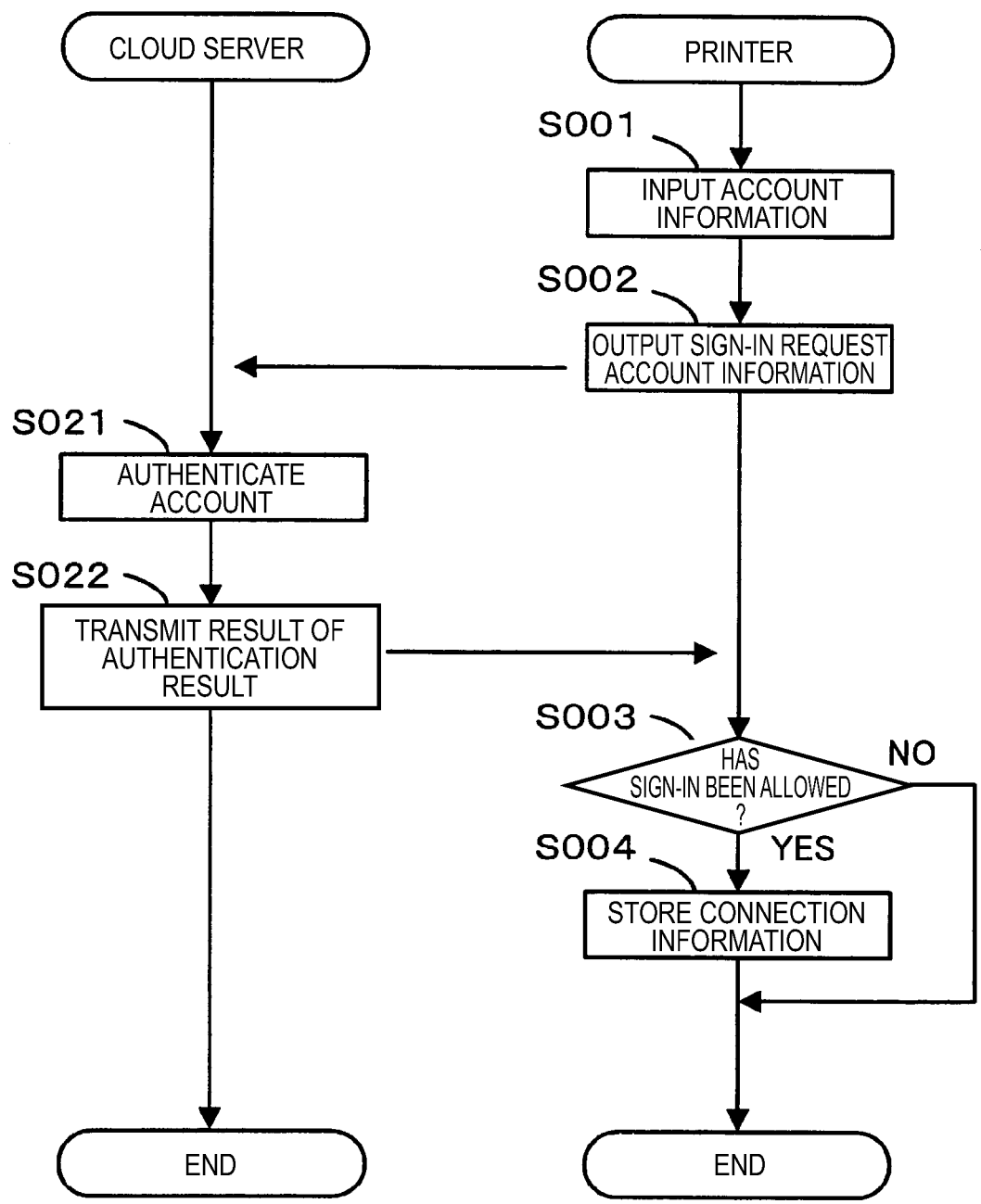
FIG. 5 is a flow chart illustrating the procedure of a sign-in operation of the cloud printing system of the exemplary embodiment.

Now, the operation procedure of each apparatus implementing a sign-in operation of the above-described cloud printing system 900 during cloud connection will be described with reference to a flow chart of FIG. 5. Incidentally, it is assumed that the printer 100 is connected to the Internet.

In order for the printer 100 to sign in to the cloud server 300, first, in STEP 5001, the user operates the operation panel 40 of the printer 100, whereby account information for sign-in to the cloud server 300 is input to the printer 100. The account information input in STEP S001 includes an account name and a password associated with that account name.

After the account information is input, in STEP S002 (one example of the establishing unit), the printer 100 outputs a sign-in request to the cloud server 300. To the sign-in request, the account information input in STEP S001 is added.

When receiving the sign-in request, in STEP S021, the cloud server 300 performs an authenticating process on the basis of the account information. Specifically, the cloud server 300 includes an account database for storing an account and a password associated with that account as one record. Therefore, when receiving the sign-in request, in a case of determining on the basis of account information included in sign-in information that the record for the user account input by the user has been stored in the account database, and the password input by the user corresponds to the password stored in the record, the cloud server 300 allows sign-in of the account. On the other hand, in a case where any record for the account input by the user does not exist, or the input password does not correspond to the stored password, the cloud server 300 does not allow sign-in. Even in log-in which the PC 200 performs to the cloud server 300, an authenticating process is performed according to the same procedure. After the account authentication in the STEP S021, in STEP S022, the cloud server 300 transmits the result of the account authentication to the printer 100.

When receiving the authentication result from the cloud server 300, in STEP S003, the printer 100 determines whether the sign-in has been allowed, that is, whether the sign-in has succeeded. In a case where the sign-in has been allowed (YES in STEP S003), the printer 100 becomes a status where communication connection with the cloud server 300 has been established (hereinafter, referred to as a "sign-in status"), and in STEP S004, the printer 100 stores connection information representing that the printer 100 is in the sign-in status to the cloud server 300 in the NVRAM 34. The connection information is erased from the NVRAM 34 when the printer 100 is signed out. The printer 100 can refer to the connection information to recognize whether the printer 100 is in the sign-in status. In a case where allowance of the sign-in has not been obtained (NO in STEP S003), communication connection is not established.

(Connection Management of Printer)

Now, management of the printer 100 on connection with the external apparatus will be described. In a case where the printer 100 of the present exemplary embodiment is in a restriction status where image forming of the image forming unit 10 is restricted, the printer 100 performs a connection restricting process for restricting connection with the external apparatus (hereinafter, referred to as "connection restriction").

The restriction status corresponds to the following status. First, if an error relative to image forming, such as a "Paper Jam" error, a "Toner Empty" error, a "No Paper" error, or a hardware failure error, occurs, unless the error is fixed, it is impossible to perform a printing operation by the image forming unit 10. For this reason, a status where an error causing a difficulty in image forming has occurred (a first restriction status) is included in the restriction status.

Besides, for example, during an operation in the power saving mode, power supply to the image forming unit 10 stops, and thus image forming is not possible. For this reason, a power saving status (a second restriction status) is included in the restriction status. Further, for example, in a case where a restriction on the number of useable sheets is defined for each user, if the number of print sheets of a user reaches the restriction on the number of useable sheets, printing of that user is prohibited. For this reason, a status where the number of print sheets has reached the restriction on the number of useable sheets (a third restriction status) is included in the restriction status.

In a case where the current status corresponds to at least one of the first to third restriction statuses, the printer 100 of the present exemplary embodiment becomes the restriction status. The first to third restriction statuses are examples of the restriction status, and any other statuses where printing is restricted may be included in the restriction status. Further, it is unnecessary to regard all of the first to third restriction statuses as the restriction status, and one or two of the first to third restriction statuses may be regarded as the restriction status.

The printer 100 has two types of connection modes with the external apparatus: the cloud connection and the direct connection. The printer 100 has processing contents of the connection restriction depending on the connection modes.

In a case of performing the connection restriction with respect to the cloud connection, if the printer 100 is in the sign-in status, the printer 100 automatically signs out. Further, if the printer 100 is not in the sign-in status, performance of sign-in is prohibited. Therefore, communication of the cloud server 300 with the printer 100 is restricted. As a result, the printer 100 is not displayed on a display of the PC 200, and thus the user of the PC 200 is unable to select the printer 100 as the input destination of the print job.

On the other hand, in a case of performing the connection restriction with respect to the direct connection, the printer 100 prohibits transmission of the capability information related to the search request. Further, if the connection restriction is performed after the capability information is transmitted, the printer 100 prohibits transmission of status information with respect to the status request. Therefore, the smartphone 210 is unable to recognize the existence or status of the printer 100. As a result, the printer 100 is not displayed on a display of the smartphone 210, and thus the user of the smartphone 210 is unable to select the printer 100 as the input destination of the print job.

Figure 6:
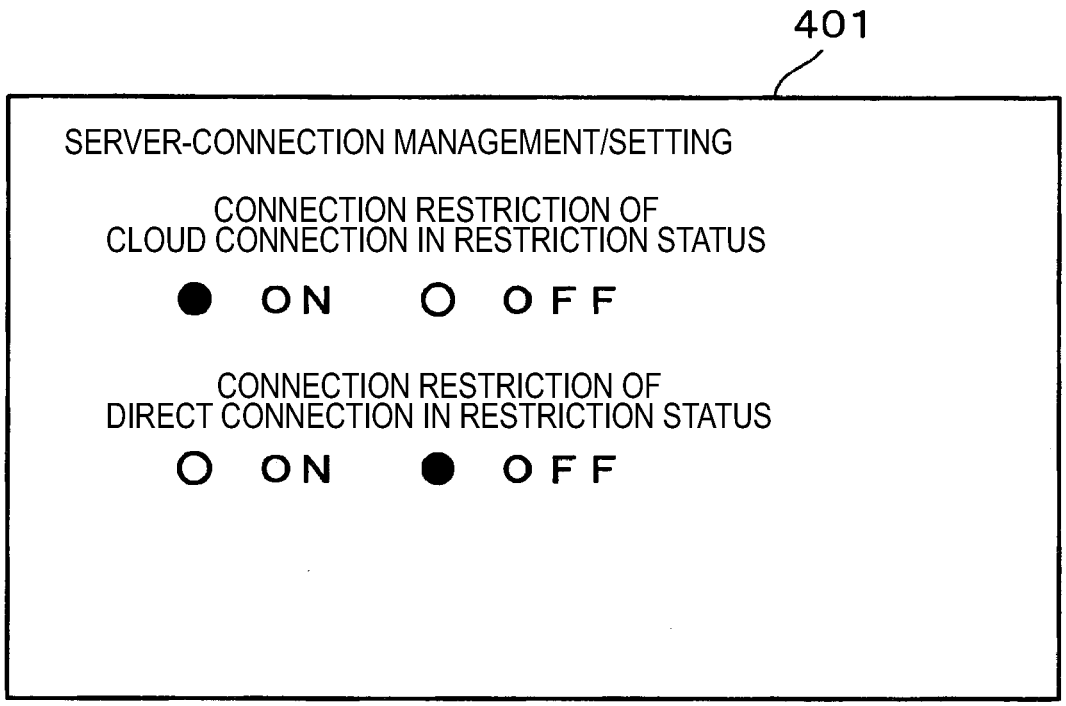
FIG. 6 shows a server-connection management/setting screen, which is displayed on the printer, showing a screen for setting responses during occurrence of an error.

Further, the printer 100 provides a setting screen 401, which allows setting whether to perform the connection restriction for each connection mode when the printer 100 is in the restriction status as shown in FIG. 6, to the operation panel 40. In the setting screen 401 of FIG. 6, in order to perform the connection restriction, the user selects "ON", and in order not to perform the connection restriction, the user selects "OFF".

Figure 7:
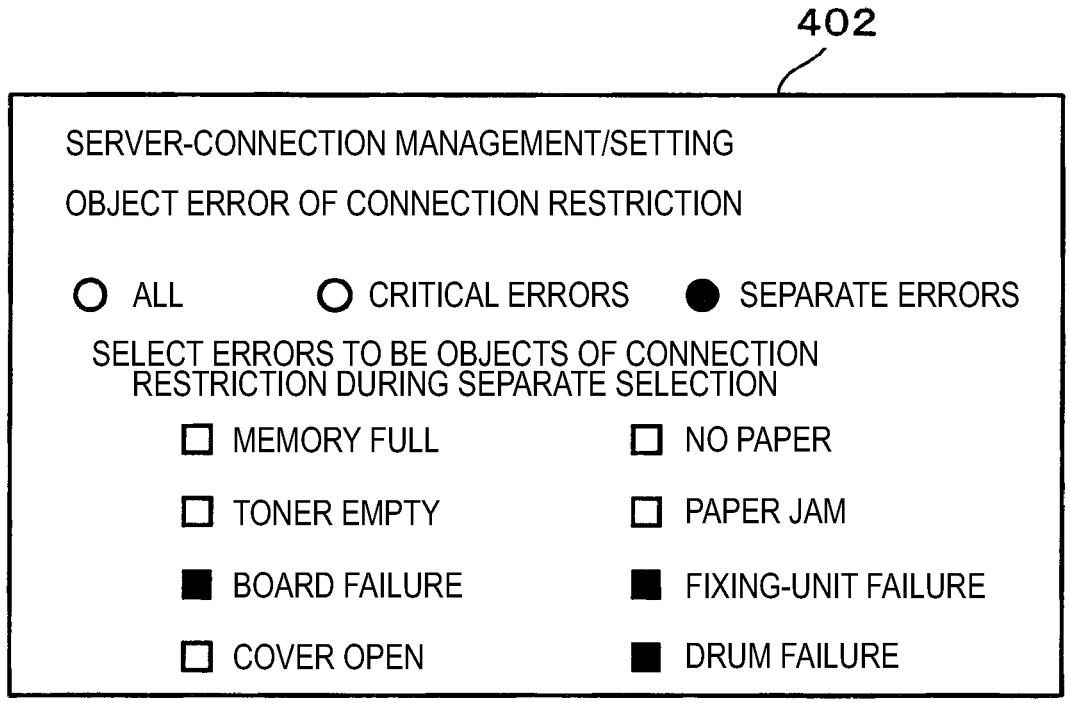
FIG. 7 shows another server-connection management/setting screen, which is displayed on the printer, showing a screen for selecting the kind of error to be an object of performance of automatic sign-out.

Further, the printer 100 enables option setting for performing the connection restriction. For example, as shown in FIG. 7, the printer 100 provides a setting screen 402 (one example of a restriction error setting unit) for selecting whether to set each kind of error as a connection restriction object to the operation panel 40. In the setting screen 402 of FIG. 7, the user selects any one of setting all errors as restriction objects, setting critical errors as restriction objects, and separately selecting errors to be restriction objects.

Critical errors are errors which it is difficult for the user to cope with. For example, errors related to a fixing unit, a driving motor, a scanner, a power supply, and an exposing unit correspond to the critical errors. On the other hand, minor errors correspond to errors which it is easy for the user to cope with, and correspond to, for example, a "No Paper" error, a "Cover Open" error, a "Paper Jam" error, and a paper size error. In a case of a minor error, since it is possible to continue performance of a job by exchange of a consumable good, the printer 100 acquires the job. On the other hand, in a case of a critical error, since it is impossible to continue performance of a job by simple maintenance work, the printer 100 does not acquire the job.

Separately selectable errors correspond to, for example, errors related to paper conveyance, such as a "Cover Open" error and a "Paper Jam" error, errors related to hardware failures such as a board failure, a fixing-unit failure, and a drum failure, errors related to exchangeable consumable goods, such as a "No Paper" error and a "Toner Empty" error, and a "Memory Full" error. Alternatives of errors are not limited to the errors shown in FIG. 7, but any other errors may also be selectable.

Figure 8:
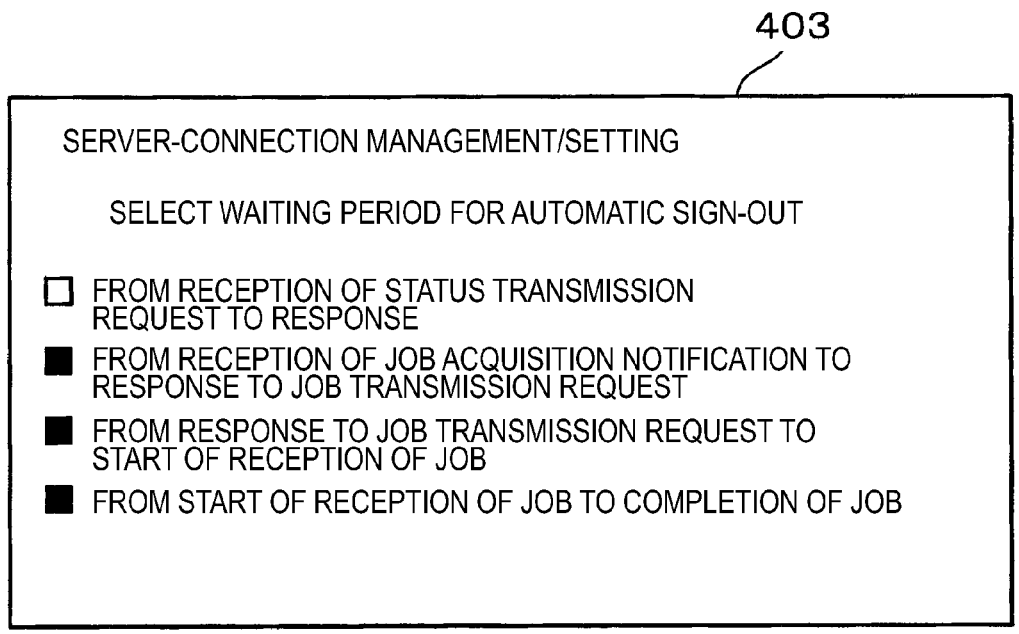
FIG. 8 shows still another server-connection management/setting screen, which is displayed on the printer, showing a screen for selecting a waiting period for waiting for performance of the automatic sign-out.

As shown in FIG. 8, the printer 100 provides a setting screen 403 (one example of a waiting-period setting unit) for setting a waiting period for waiting for performance of the connection restriction to the operation panel 40. In the setting screen 403 of FIG. 8, the user makes a period to be the waiting period a checked status, and makes a period not to be the waiting period as an unchecked status. The option contents of each of the setting screens 401, 402, and 403 are stored in the NVRAM 34.

Figure 3:
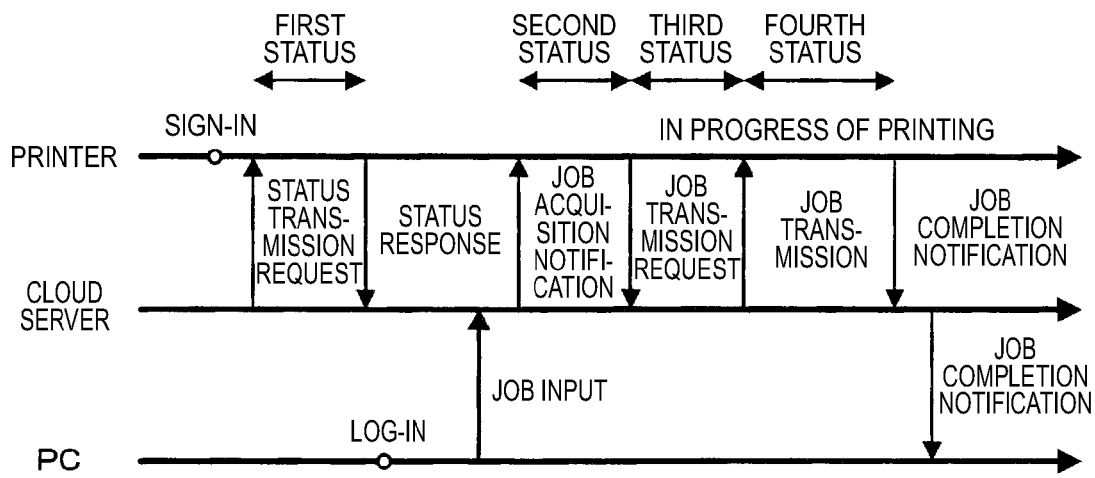
FIG. 3 is a sequence diagram schematically illustrating an operation of the cloud printing system of the exemplary embodiment during cloud connection.

A selectable period corresponds to, for example, a period from when a status transmission request is received from the cloud server 300 to when a response to that request is made (a first status of FIG. 3). If the connection restriction is performed in that period, the actual status of the printer 100 may not correspond to the status of the printer 100 which the cloud server 300 recognizes. For this reason, that period is selectable as a waiting period.

Another selectable period corresponds to, for example, a period from when a procedure of acquisition of a job from the cloud server 300 starts to when processing of the job is completed (second to fourth statuses of FIG. 3). If the connection restriction is performed in that period, acquisition of data may become insufficient, and even if an error having caused the restriction status is fixed, the possibility of failing in recovery may be high. For this reason, that period is selectable as a waiting period.

Incidentally, in the present exemplary embodiment, a period from when a procedure of acquisition of a job from the cloud server 300 starts to when processing of the job is completed can be divided into three settable periods: a period from job acquisition notification to response thereto (the second status of FIG. 3); a period from that response to when reception of a job starts (the third status of FIG. 3); and a period from when the reception of the job starts to when processing of the job is completed (the fourth status of FIG. 3). Therefore, setting of a more detailed waiting period becomes possible.

(Connection Managing Process of Printer)

A connection managing process for implementing the above-described connection management will be described with reference to flow charts of FIGS. 9 and 10. The connection managing process is a process of managing connection with the external apparatus by cloud connection, and the CPU 31 performs the connection managing process in response to start of the printer 100.

Figure 9:
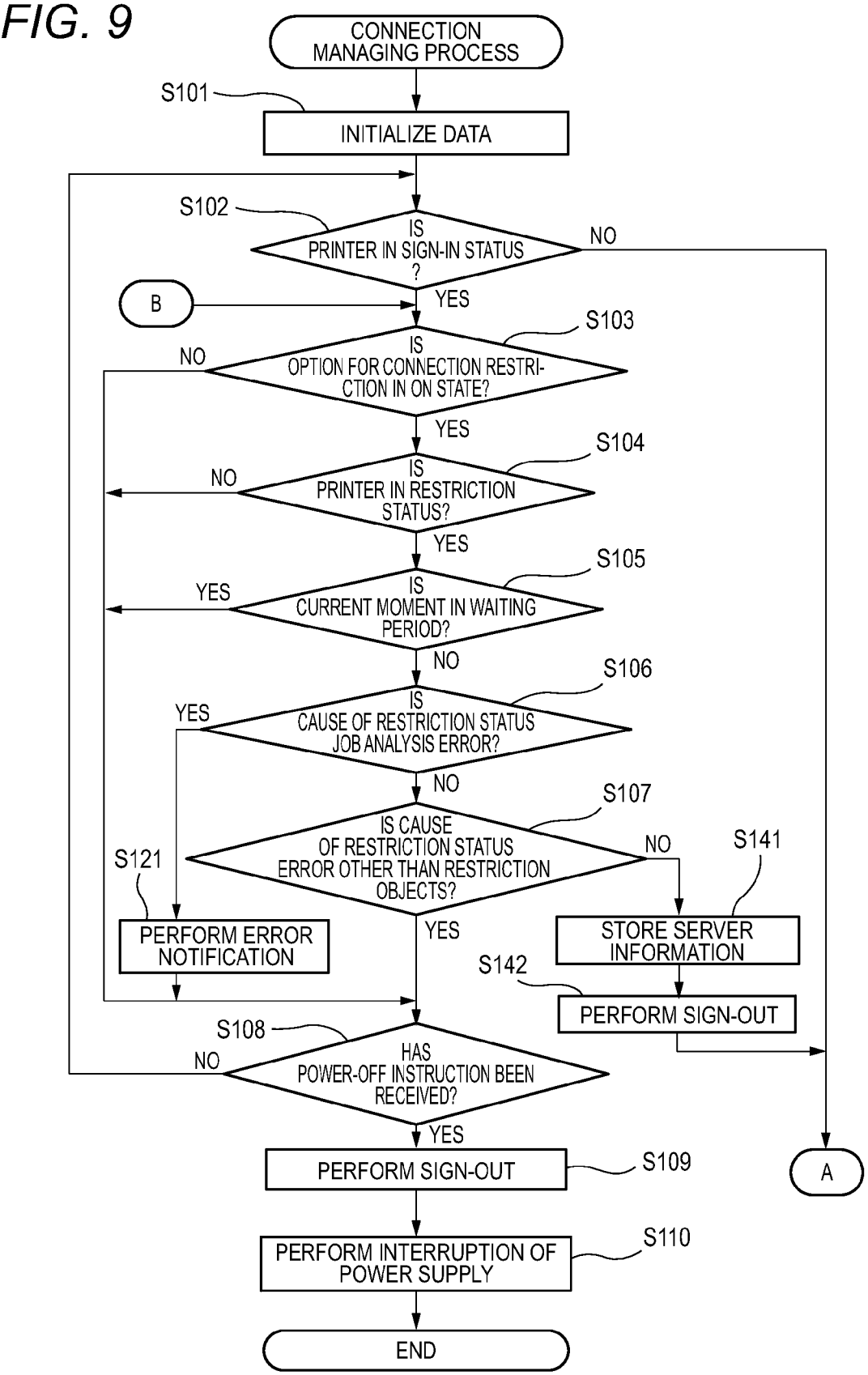
FIG. 9 is a flow chart (first half) illustrating an operation procedure of a connection managing process of the printer according to the exemplary embodiment.

In the connection managing process, first, as shown in FIG. 9, in STEP S101, the CPU 31 initializes various data. For example, the CPU 31 clears server information. The server information will be described below. Next, in STEP S102, the CPU 31 determines whether the printer 100 is in the sign-in status.

In a case where the printer 100 is in the sign-in status (YES in STEP S102), in STEP S103, the CPU 31 determines whether to perform the connection restriction with respect to the cloud connection, that is, whether an option for the connection restriction of the cloud connection is in an ON state. In a case where the option for the connection restriction is in an OFF state (NO in STEP S103), the CPU 31 proceeds to STEP S108 without performing the connection restriction.

In a case where the option for the connection restriction is in an ON state (YES in STEP S103), in STEP S104, the CPU 31 determines whether the printer 100 is in the restriction status at the current moment. In the present exemplary embodiment, as described above, the restriction status means a status corresponding to at least one of a status where an error related to image forming has occurred, a status where the printer 100 is in the power saving mode, and a status where the number of print sheets has reached the restriction on the number of useable sheets. If the printer 100 is not in the restriction status (NO in STEP S104), the CPU 31 proceeds to STEP S108 without performing the connection restriction.

If the printer 100 is in the restriction status (YES in STEP S104), in STEP 5105, the CPU 31 determines whether the current moment is in the waiting period (one example of a determining unit). The waiting period can be set by the above-described setting screen 403 of FIG. 8. In a case where the current moment is in the waiting period (YES in STEP S105), the CPU 31 proceeds to STEP S108 in which the CPU 31 does not perform the connection restriction until the waiting period elapses. Incidentally, in a case where the status of the printer 100 has become the restriction status in the waiting period, since it is unnecessary to perform the connection restriction, the CPU 31 proceeds from STEP S104 to STEP S108 without performing the connection restriction.

If the current moment is not in the waiting period (NO in STEP S105), in STEP S106 (one example of the discriminating unit or the deciding unit), the CPU 31 discriminates an error having occurred in the printer 100, and determines whether a cause of the restriction status is occurrence of a job analysis error. Examples of the job analysis error include an error of conversion of print data into a bitmap image, and a syntax error of print data. Since the job analysis error is not an error of the printer 100 itself, it may be possible to receive a corrected job and perform printing. Therefore, in a case where the cause of the restriction status is a job analysis error (YES in STEP S106), in STEP S121 (one example of the notifying unit), the CPU 31 instructs the cloud server 300 to perform error notification for requesting the job input source apparatus to retransmit a corrected job. Then, the CPU 31 proceeds to STEP S108 without performing the connection restriction.

If the cause of the restriction status is not a job analysis error (NO in STEP S106), in STEP S107 (one example of the discriminating unit or the deciding unit), the CPU 31 determines whether the cause of the restriction status is an error other than the restriction objects. The error other than the restriction objects can be set by the above-described setting screen 402 of FIG. 7. Incidentally, in a case of determining that the printer has become the restriction status by the power saving mode or the restriction of use, it is determined that the cause of the restriction status is not an error other than the restriction objects.

In a case where the cause of the restriction status is not an error other than the restriction objects (NO in STEP S107), in STEP S141 (one example of the storage unit), the CPU 31 stores server information (for example, destination information of the cloud server 300, an account singed in, and a password) which is information of an external apparatus (the cloud server 300 in the present exemplary embodiment) which the printer is currently signed in to.

After STEP S141, in STEP S142 (one example of the restricting unit), the printer 100 independently performs sign-out with respect to the external apparatus to which the printer 100 is signed in to. After STEP S142, the CPU 31 proceeds to STEP S161 of FIG. 10. The process of STEP S161 and the subsequent processes will be described below.

If the cause of the restriction status is an error other than the restriction objects (YES in STEP S107), or in a case of determining not to perform the connection restriction, in STEP S108 (one example of the interruption receiving unit), the CPU 31 determines whether any power-off instruction has been received. In the printer 100 of the present exemplary embodiment, pressing of the soft power switch 41 corresponds to the power-off instruction. In a case where a power-off instruction has not been received (NO in STEP S108), the CPU 31 proceeds to STEP S102 in which the CPU 31 determines whether the printer 100 is in the sign-in status, and repeats the subsequent processes of STEP S102.

In a case where a power-off instruction has been received (YES in STEP S108), in STEP S109, the printer 100 independently perform sign-out. That is, even if the soft power switch 41 is pressed, power supply does not immediately stop, and after a terminating process including sign-out is performed, the power supply stops. If power supply stops without performing sign-out, in a case where the power supply stops immediately after a response to the status transmission request from the cloud server 300 is made, it takes a long time until the cloud server 300 recognizes the stop of the power supply, that is, the cloud server 300 outputs the next status transmission request. Therefore, despite the stop of the power supply, a time lag until the user can designate the printer 100 becomes long. For this reason, after performing sign-out, in STEP S110, the CPU 31 performs interruption of the power supply. After STEP S110, the CPU 31 terminates the connection restricting process.

Figure 10:
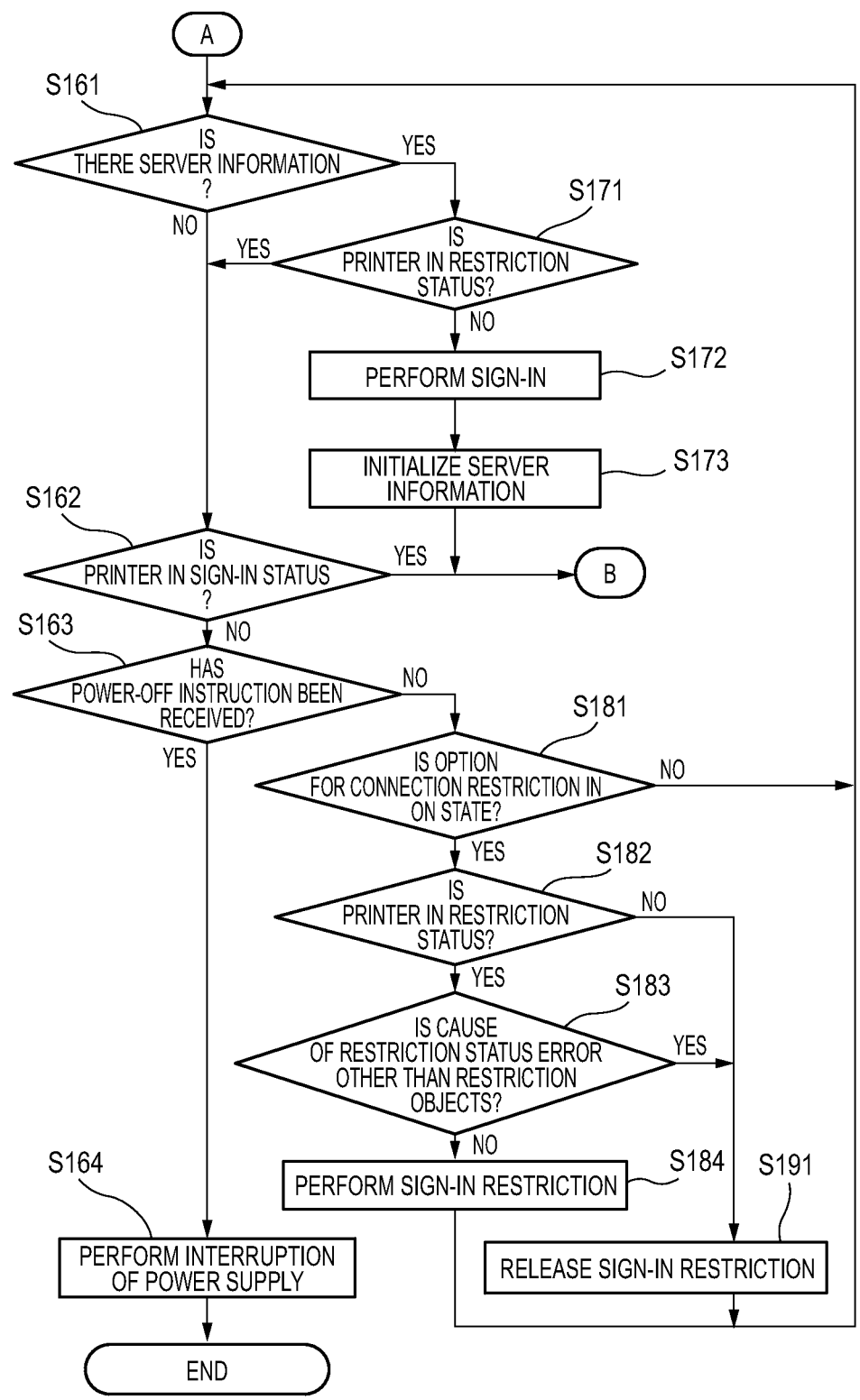
FIG. 10 is a flow chart (second half) illustrating the operation procedure of the connection managing process of the printer continued from FIG. 9.

On the other hand, if the printer is not in the sign-in status (NO in STEP S102), or after sign-out is performed as the connection restriction in STEP S142, the CPU 31 proceeds to STEP S161 of FIG. 10 in which the CPU 31 determines whether there is server information. Here, the server information is information stored in the process of STEP S141 of FIG. 9, that is, information on a sign-in history prior to the performance of the connection restriction. That is, existence of the server information means that the printer 100 which was in the sign-in status has independently performed sign-out.

In a case where there is the server information (YES in STEP S161), in STEP S171, the CPU 31 determines whether the printer 100 is in the restriction status even at the current moment. In a case where the printer 100 is not in the restriction status (NO in STEP S171), in STEP S172 (one example of the reestablishing unit), the printer 100 uses the server information to independently perform sign-in. That is, the printer 100 returns the connection status to the state prior to the independent performance of sign-out. After STEP S172, the CPU 31 initializes the server information in STEP S173, and proceeds to the process of STEP S103 of FIG. 9.

On the other hand, in a case where there is no server information (NO in STEP S161), or in a case where the printer 100 is in the restriction status (YES in STEP S171), in STEP S162, the CPU 31 determines whether the printer 100 is in the sign-in status. If the printer 100 is in the sign-in status (YES in STEP S162), the CPU 31 proceeds to the process of STEP S103 of FIG. 9.

If the printer 100 is in the sign-out state (NO in STEP S162), in STEP S163, the CPU 31 determines whether any power-off instruction has been received. The determination of STEP S163 is the same as the determination of STEP S108 of FIG. 9. In a case where a power-off instruction has been received (YES in STEP S163), the CPU 31 performs interruption of power supply in STEP S164, and terminates the connection managing process.

In a case where any power-off instruction has not been received (NO in STEP S163), in STEP S181, the CPU 31 determines whether the option for the connection restriction of the cloud connection is in the ON state. The determination of STEP S181 is the same as the determination of STEP S103 of FIG. 9. In a case where the option for the connection restriction is in the OFF state (NO in STEP S181), the CPU 31 proceeds to STEP S161 without performing the connection restriction.

In a case where the option for the connection restriction is in the ON state (YES in STEP S181), in STEP S182, the CPU 31 determines whether the printer 100 is in the restriction status at the current moment. The determination of STEP S182 is the same as the determination of STEP S104 of FIG. 9. In a case where the printer 100 is in the restriction status (YES in STEP S182), in STEP S183 (one example of the discriminating unit or the deciding unit), the CPU 31 determines whether the cause of the restriction status is an error other than the restriction objects. The determination of STEP S183 is the same as the determination of STEP S107 of FIG. 9.

In a case where the cause of the restriction status is not an error other than the restriction objects (NO in STEP S183), in STEP S184 (one example of the restricting unit), the CPU 31 performs sign-in restriction as the connection restriction. In the sign-in restriction, for example, input of an account or a password for performing sign-in is prohibited. Alternatively, transmission of input information to the cloud server 300 is prohibited. After STEP S184, the CPU 31 proceeds to STEP S161.

On the other hand, in a case where the printer 100 is not in the restriction status (NO in STEP S182), or in a case where the cause of the restriction status is an error other than the restriction objects (YES in STEP S183), in STEP S191, the CPU 31 releases the sign-in restriction. After STEP S191, the CPU 31 proceeds to STEP S161. Incidentally, on the occasion of STEP S191, in a case where the sign-in restriction has already been released, the STEP S191 is skipped. Similarly, on the occasion of STEP S184, in a case where the sign-in restriction has already been performed, the STEP S184 is skipped.

As described above, in the printer 100 of the present exemplary embodiment, if the printer 100 establishes the sign-in state to the cloud server 300, it is possible to use the PC 200 to designate the printer 100 as the job input destination through the cloud server 300. Further, in a case where the printer 100 is in the restriction status, the printer 100 restricts establishment of the sign-in status to the cloud server 300. Therefore, it is possible to prevent the printer 100 from being designated as the job input destination by the user.

(Direct-Connection Managing Process of Printer)

Now, the direct-connection managing process for managing connection with an external apparatus by direct connection will be described with reference to flow charts of FIGS. 11 and 12. Similarly to the above-described connection managing process for the cloud connection, the direct-connection managing process is also performed in response to start of the printer 100 by the CPU 31.

Figure 11:
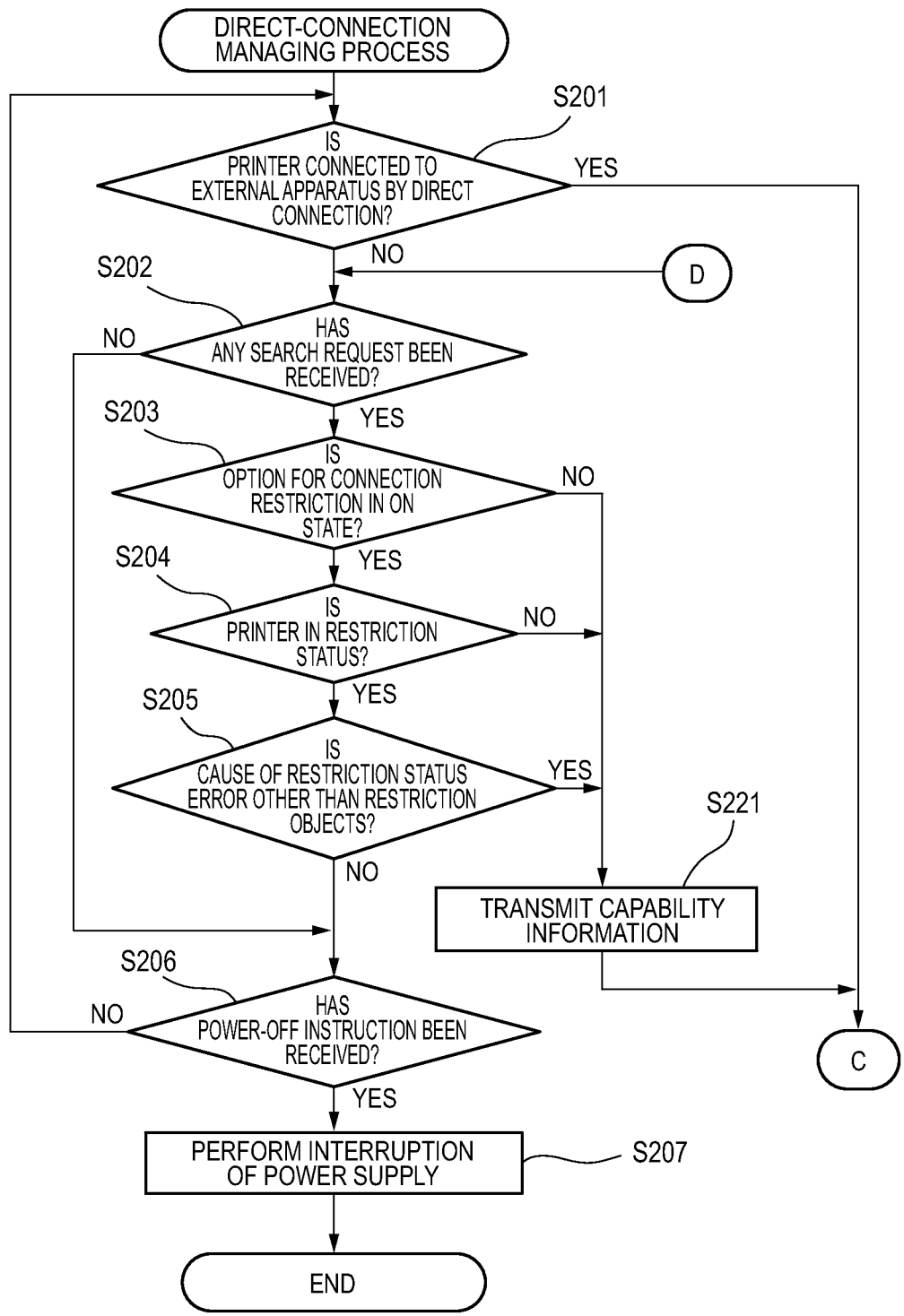
FIG. 11 is a flow chart (first half) illustrating the operation procedure of a direct-connection managing process of the printer according to the exemplary embodiment.

In the direct-connection managing process, as shown in FIG. 11, in step S201, the CPU 31 determines whether the printer 100 is connected to an external apparatus (e.g., the smartphone 210 in the present exemplary embodiment) by direct connection. If the printer 100 is not connected to the external apparatus (NO in step S201), in STEP S202, the CPU 31 determines whether any search request has been received from the external apparatus. In a case where any search request has not been received (NO in STEP S202), the CPU 31 proceeds to STEP S206.

In a case where a search request has been received (YES in STEP S202), in STEP S203, the CPU 31 determines whether to perform connection restriction with respect to the direct connection, that is, whether an option for the connection restriction of the direct connection is in the ON state in the setting screen 401 of FIG. 6. In a case where the option for the connection restriction is in the OFF state (NO in STEP S203), the CPU 31 proceeds to STEP S221, without performing the connection restriction.

In a case where the option for the connection restriction is in the ON state (YES in STEP S203), in STEP S204, the CPU 31 determines whether the printer 100 is in the restriction status at the current moment. The determination of STEP S204 is the same as the determination of STEP S104 of FIG. 9. If the printer 100 is not in the restriction status (NO in STEP S204), the CPU 31 proceeds to STEP S221 without performing the connection restriction.

If the printer 100 is in the restriction status (YES in STEP S204), in STEP S205 (one example of the discriminating unit or the deciding unit), the CPU 31 determines whether the cause of the restriction status is an error other than the restriction objects. The determination of STEP S205 is the same as the determination of STEP S107 of FIG. 9. In a case where the cause of the restriction status is not an error other than the restriction objects (NO in STEP S205), the CPU 31 proceeds to step S206 as the connection restriction without responding to the search request (one example of the restricting unit).

On the other hand, in a case where the cause of the restriction status is an error other than the restriction objects (YES in STEP S205), or in a case where the printer 100 is not in the restriction status (NO in STEP S204), or in a case where the option for the connection restriction is in the OFF state (NO in step S203), in STEP S221, the CPU 31 transmits capability information (one example of a transmitting unit or an establishing unit). Therefore, the external apparatus having performed the search request can recognize the printer 100, and direct connection with the external apparatus is established. After STEP S221, CPU 31 proceeds to STEP S251 of FIG. 12.

If the cause of the restriction status is not an error other than the restriction objects (NO in step S205), or if any search request has not been received (NO in step S202), in step S206, the CPU 31 determines whether any power-off instruction has been received. The determination of STEP S206 is the same as the determination of STEP S108 of FIG. 9. In a case where any power-off instruction has not been received (NO in STEP S206), the CPU 31 proceeds to STEP S201, and repeats the process of STEP S201 and the subsequent processes. In a case where a power-off instruction has been received (YES in STEP S206), the CPU 31 performs interruption of power supply in STEP S207, and terminates the direct-connection managing process.

Figure 12:
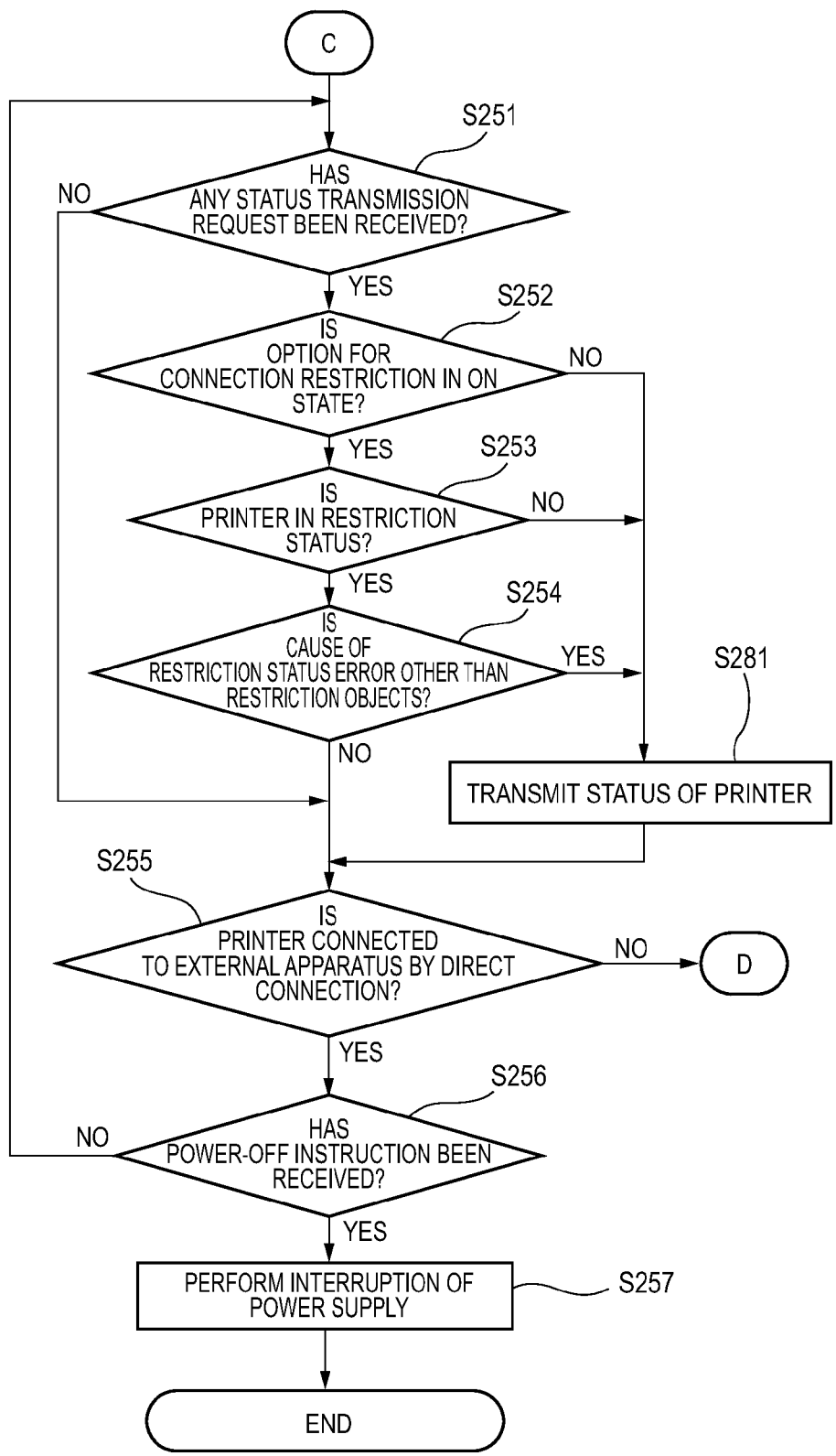
FIG. 12 is a flow chart (second half) illustrating the operation procedure of the direct-connection managing process of the printer continued from FIG. 11.

On the other hand, if the printer is connected to an external apparatus (YES in step S201), or after direct connection is established in STEP S221, the CPU 31 proceeds to STEP S251 of FIG. 12 in which the CPU 31 determines whether any status transmission request has been received from the connection destination. If any status transmission request has not been received (NO in STEP S251), the CPU 31 proceeds to STEP S255.

In a case where a status transmission request has been received (YES in STEP S251), in STEP S252, the CPU 31 determines whether the option for the connection restriction of the direct connection is in the ON state. The determination of STEP S252 is the same as the determination of STEP S203 of FIG. 11. In a case where the option for the connection restriction is in the ON state (YES in STEP S252), in STEP S253, the CPU 31 determines whether the printer 100 is in the restriction status at the current moment. The determination of STEP S253 is the same as the determination of STEP S104 of FIG. 9. If the printer 100 is in the restriction status (YES in STEP S253), in STEP S254, the CPU 31 determines whether the cause of the restriction status is an error other than the restriction objects (one example of the discriminating unit or the deciding unit). The determination of STEP S254 is the same as the determination of STEP S107 of FIG. 9.

In a case where the cause of the restriction status is an error other than the restriction objects (YES in STEP S254), or in a case where the printer 100 is not in the restriction status (NO in STEP S253), or in a case where the option for the connection restriction is in the OFF state (NO in step S252), in STEP S281, the CPU 31 transmits the status of the printer 100 without performing the connection restriction (one example of a transmitting unit). That is, the connection status of the direct connection is maintained. After STEP S281, the CPU 31 proceeds to STEP S255.

On the other hand, if the cause of the restriction status is not error other than the restriction objects (NO in STEP S254), the CPU 31 proceeds to step S255 as the connection restriction without responding to the status transmission request (one example of the restricting unit). Therefore, the connection status of the direct connection is interrupted.

In STEP S255, the CPU 31 determines whether the printer 100 is connected to the external apparatus by direct connection. If the printer 100 is not connected to the external apparatus (NO in step S255), the CPU 31 proceeds to step S202 of FIG. 11 in which the CPU 31 waits for a search request.

If the printer 100 is connected to the external apparatus (YES in step S255), in step S256, the CPU 31 determines whether any power-off instruction has been received. The determination of STEP S256 is the same as the determination of STEP S108 of FIG. 9. In a case where any power-off instruction has not been received (NO in STEP S256), the CPU 31 proceeds to STEP S251, and repeats the process of STEP S152 and the subsequent processes. In a case where a power-off instruction has been received (YES in STEP S256), the CPU 31 performs interruption of power supply in STEP S257, and terminates the direct-connection managing process.

As described above, in the printer 100 of the present exemplary embodiment, in the connection restriction of the direct connection, transmission of the capability information is restricted. Therefore, the printer 100 is prevented from being recognized as a job input destination by the smartphone 210. Further, if the printer is already connected to the external apparatus, a response to a status transmission request is restricted, whereby the printer is removed from the job input destinations. Therefore, when the restriction status has occurred, it is possible to prevent the printer from being designated as a job input destination by the user.

The above-described exemplary embodiment is merely illustrative and not restrictive of the present invention. Therefore, needless to say, the present invention can be improved and modified within a scope of the invention. For example, the image processing apparatus is not limited to a printer, but can be any other apparatuses having an image processing function, such as a scanner, a fax machine, a multi-function apparatus, and a copy machine. Further, the external apparatus for inputting a print job to the image processing apparatus is not limited to a PC or a smartphone, but may be a mobile device such as a PDA.

Further, in order to establish connection between the printer 100 and the cloud server 300, the cloud printing system 900 of the exemplary embodiment requests a password, and performs the authenticating process. However, the authentication process may be skipped.

Further, in the above-described exemplary embodiment, the cloud server 300 stores the sign-in of the printer 100, and when receiving a print job designating the printer 100, the cloud server 300 outputs a job acquisition notification or a status transmission request to the printer 100. However, the present invention is not limited thereto. For example, after sign-in to the cloud server 300 succeeds, the printer 100 may regularly make a transmission request to the cloud server 300, whereby the print job input to the cloud server 300 is transmitted to the printer 100.

Further, in the above-described exemplary embodiment, the status transmission request is regularly made from the smartphone 210, whereby the direct connection is maintained. However, the present invention is not limited thereto. For example, the status information may be regularly transmitted from the printer 100 to the smartphone 210, such that the direct connection is maintained. In this case, as the connection restriction, for example, transmission of the status information from the printer 100 is restricted.

Further, in the above-described exemplary embodiment, if the mode switch 42 is pressed, the printer returns from the power saving mode to the power supply mode. However, the condition for returning to the power supply mode is not limited thereto. For example, the printer may return to the power supply mode in response to reception of a job from the external apparatus.

Further, in the above-described exemplary embodiment, it is possible for the user to select whether to perform the connection restriction. However, whether to perform the connection restriction may not be selected by the user. Similarly, the waiting period and the kinds of errors may not be selected by the user. That is, all periods and all errors may be set as connection restriction objects.

Further, in the above-described exemplary embodiment, as the connection modes, both of the cloud connection and the direct connection are supported. However, only one of the cloud connection and the direct connection may be supported. Further, in the exemplary embodiment, as the connection restriction, both of interruption of communication in the connection status and prohibition of transition to the connection status are performed. However, only one of interruption of communication in the connection status and prohibition of transition to the connection status may be performed.

Further, the processes disclosed in the exemplary embodiment may be performed by a single CPU, a plurality of CPUs, hardware such as an ASIC, or a combination thereof. Further, the processes disclosed in the exemplary embodiment can be implemented in various forms such as a recording medium having a program for performing the processes recorded thereon, or a method.

In the above-described embodiment, single CPU may perform all of the processes. Nevertheless, the disclosure may not be limited to the specific embodiment thereof, and a plurality of CPUs, a special application specific integrated circuit ("ASIC"), or a combination of a CPU and an ASIC may be used to perform the processes.

What is claimed is:

1. An image processing apparatus comprising:
   a receiving unit configured to receive a job from an external apparatus;
   an image processing unit configured to perform image processing on the basis of the job received by the receiving unit; and
   a control device configured to perform:
      an establishing process of establishing an allowance status in which the image processing apparatus is allowed to be designated as a job input destination from a user, with respect to the external apparatus; and
      a restricting process of restricting the image processing apparatus from being in the allowance status in a case where the image processing apparatus is in a restriction status in which the image processing is restricted;
   wherein the control device is further configured to perform:

a storage process of storing history information, which is information representing that the allowance status with respect to the external apparatus has been released; and a reestablishing process of establishing the allowance status with respect to the external apparatus if the image processing apparatus is in a non-restriction status in which the image processing is not restricted, in a case where the storage process has stored the history information therein.

2. The image processing apparatus according to claim 1, wherein in a case where the allowance status with respect to the external apparatus has been established, the restricting process releases the establishment of the allowance status with respect to the external apparatus by the establishing process, as the restricting process.

3. The image processing apparatus according to claim 1, wherein in a case where the allowance status with respect to the external apparatus has not been established, the restricting process restricts establishment of the allowance status with respect to the external apparatus by the establishing process, as the restricting process.

4. The image processing apparatus according to claim 1, further comprising:
an interruption receiving unit configured to receive an interruption request for interrupting power supply,
wherein the control device is further configured to perform:
an interrupting process of interrupting power supply in response to the interruption request, and
wherein when the interruption request is received in a case where the allowance status with respect to the external apparatus has been established, the interrupting process releases the allowance status, and after the release, the interrupting process interrupts power supply to the image processing apparatus except for a part for activating the image processing apparatus.

5. The image processing apparatus according to claim 1, wherein the restriction status includes a status in which an error has occurred in the image processing apparatus.

6. The image processing apparatus according to claim 5, wherein the control device is further configured to perform:
a discriminating process of discriminating a kind of the error having occurred in the image processing apparatus; and
a deciding process of deciding whether the restricting process is necessary or unnecessary on the basis of the discrimination result by the discriminating process, and
wherein in a case where the deciding process decides that the restricting process is unnecessary, the control device is configured not to perform the restricting process.

7. The image processing apparatus according to claim 6, wherein in a case where the discrimination result by the discriminating process indicates that the error is a job analysis error, the deciding process decides that the restricting process is unnecessary.

8. The image processing apparatus according to claim 7, wherein the control device is further configured to perform:
a notifying process of notifying that there is an error in a job, in the case where the discrimination result by the discriminating process indicates that the error is a job analysis error.

9. The image processing apparatus according to claim 6, wherein in a case where the discrimination result by the discriminating process indicates that the error is an error allowing acquisition of the job, the deciding process decides that the restricting process is unnecessary, and wherein in a case where the discrimination result by the discriminating process indicates that the error is an error making acquisition of the job impossible, the deciding process decides that the restricting process is necessary.

10. The image processing apparatus according to claim 6, wherein the control device is further configured to perform:
a restriction error setting process of allowing setting of whether the restricting process is necessary for each kind of error, and
wherein the deciding process decides whether the restricting process is necessary or unnecessary on the basis of the discrimination result by the discriminating process and the set contents by the restriction error setting process.

11. The image processing apparatus according to claim 1, wherein the control device is further configured to perform:
a determining process of determining whether a detection timing of the restriction status is in a waiting period when it is necessary to wait for the restricting process, and
wherein in a case where the determining process determines that the detection timing is in the waiting period, the control device is configured not to perform the restricting process until the waiting period elapses.

12. The image processing apparatus according to claim 11, wherein the determining process sets a period from when a status transmission request is received from the external apparatus to when a response to the status transmission request is completed as the waiting period.

13. The image processing apparatus according to claim 11, wherein the determining process sets a period from when a procedure of acquiring a job from the external apparatus starts to when completion of the corresponding job is notified as the waiting period.

14. The image processing apparatus according to claim 11, wherein the control device is further configured to perform:
a waiting-period setting process of allowing setting of the waiting period.

15. The image processing apparatus according to claim 1, wherein the image processing apparatus has a power saving status, in which power supply to an element for the image processing is restricted, and a waiting status for waiting for performance of the image processing without restricting power supply to the element,
wherein the image processing apparatus further comprises a switching unit configured to switch the image processing apparatus between the power saving status and the waiting status, and
wherein the restriction status includes a status in which the image processing apparatus is in the power saving status.

16. The image processing apparatus according to claim 15, further comprising:
a transition receiving unit configured to receive a transition operation for transition from the power saving status to the waiting status,
wherein in a case where the transition operation is received during an operation in the power saving status, the switching unit is configured to switch the image processing apparatus to the waiting status.

17. The image processing apparatus according to claim 1, wherein the restriction status includes a status where the user using the image processing apparatus has reached a restriction on a use.

18. An image processing system comprising the image processing apparatus according to claim 1 and an external apparatus configured to input a job to the image processing apparatus.

19. An image processing apparatus comprising:
a receiving unit configured to receive a job from an external apparatus;
an image processing unit configured to perform image processing on the basis of the job received by the receiving unit; and
a control device configured to perform:
a transmitting process of transmitting receiver information, which is information for making the image processing apparatus be recognized as a job input destination, to the external apparatus; and
a restricting process of restricting the receiver information from being transmitted by the transmitting process in a case where the image processing apparatus is in a restriction status in which the image processing is restricted;
wherein the restriction status includes a status where the user using the image processing apparatus has reached a restriction on a use.

20. The image processing apparatus according to claim 19, wherein the restriction status includes a status in which an error has occurred in the image processing apparatus.

21. The image processing apparatus according to claim 20, wherein the control device is further configured to perform:
a discriminating process of discriminating a kind of the error having occurred in the image processing apparatus; and
a deciding process of deciding whether the restricting process is necessary or unnecessary on the basis of the discrimination result by the discriminating process, and
wherein in a case where the deciding process decides that the restricting process is unnecessary, the control device is configured not to perform the restricting process.

22. The image processing apparatus according to claim 21, wherein in a case where the discrimination result by the discriminating process indicates that the error is an error allowing acquisition of the job, the deciding process decides that the restricting process is unnecessary, and
wherein in a case where the discrimination result by the discriminating process indicates that the error is an error making acquisition of the job impossible, the deciding process decides that the restricting process is necessary.

23. The image processing apparatus according to claim 21, wherein the control device is further configured to perform:
a restriction error setting process of allowing setting of whether the restricting process is necessary for each kind of error, and
wherein the deciding process decides whether the restricting process is necessary or unnecessary on the basis of the discrimination result by the discriminating process and the set contents by the restriction error setting process.

24. The image processing apparatus according to claim 19, wherein the image processing apparatus has a power saving status, in which power supply to an element for the image processing is restricted, and a waiting status for waiting for performance of the image processing without restricting power supply to the element,
wherein the image processing apparatus further comprises a switching unit configured to switch the image processing apparatus between the power saving status and the waiting status, and
wherein the restriction status includes a status in which the image processing apparatus is in the power saving status.

25. The image processing apparatus according to claim 24, further comprising:
a transition receiving unit configured to receive a transition operation for transition from the power saving status to the waiting status,
wherein in a case where the transition operation is received during an operation in the power saving status, the switching unit is configured to switch the image processing apparatus to the waiting status.

26. An image processing system comprising the image processing apparatus according to claim 19 and an external apparatus configured to input a job to the image processing apparatus.

27. An image processing apparatus comprising:
a receiving unit configured to receive a job from an external apparatus;
an image processing unit configured to perform image processing on the basis of the job received by the receiving unit; and
a control device configured to perform:
an establishing process of establishing an allowance status in which the image processing apparatus is allowed to be designated as a job input destination from a user, with respect to the external apparatus; and
a restricting process of restricting the image processing apparatus from being in the allowance status in a case where the image processing apparatus is in a restriction status in which the image processing is restricted;
wherein the control device is further configured to perform:
a determining process of determining whether a detection timing of the restriction status is in a waiting period when it is necessary to wait for the restricting process;
wherein in a case where the determining process determines that the detection timing is in the waiting period, the control device is configured not to perform the restricting process until the waiting period elapses; and
wherein the determining process sets a period from when a status transmission request is received from the external apparatus to when a response to the status transmission request is completed as the waiting period.

28. An image processing apparatus comprising:
a receiving unit configured to receive a job from an external apparatus;
an image processing unit configured to perform image processing on the basis of the job received by the receiving unit; and
a control device configured to perform:
a transmitting process of transmitting receiver information, which is information for making the image processing apparatus be recognized as a job input destination, to the external apparatus; and
a restricting process of restricting the receiver information from being transmitted by the transmitting process in a case where the image processing apparatus is in a restriction status in which the image processing is restricted;
wherein the restriction status includes a status in which an error has occurred in the image processing apparatus;
wherein the control device is further configured to perform:
a discriminating process of discriminating a kind of the error having occurred in the image processing apparatus; and a deciding process of deciding whether the restricting process is necessary or unnecessary on the basis of the discrimination result by the discriminating process;

wherein in a case where the deciding process decides that the restricting process is unnecessary, the control device is configured not to perform the restricting process;

wherein the control device is further configured to perform:
a restriction error setting process of allowing setting of whether the restricting process is necessary for each kind of error; and wherein the deciding process decides whether the restricting process is necessary or unnecessary on the basis of the discrimination result by the discriminating process and the set contents by the restriction error setting process.

* * * * *